United States Patent
Hassan et al.

(10) Patent No.: US 9,011,969 B2
(45) Date of Patent: Apr. 21, 2015

(54) LOW-E PANEL WITH IMPROVED DIELECTRIC LAYER AND METHOD FOR FORMING THE SAME

(75) Inventors: Mohd Fadzli Anwar Hassan, San Francisco, CA (US); Richard Blacker, Farmington Hills, MI (US); Yiwei Lu, Ann Harbor, MI (US); Minh Anh Nguyen, San Jose, CA (US); Zhi-Wen Sun, Sunnyvale, CA (US); Guowen Ding, San Jose, CA (US); Jingyu Lao, Saline, MI (US); Hien Minh Huu Le, San Jose, CA (US)

(73) Assignees: Intermolecular, Inc., San Jose, CA (US); Guardian Industries Corp., Auburn Hills, MI (US)

( * ) Notice: Subject to any disclaimer, the term of this patent is extended or adjusted under 35 U.S.C. 154(b) by 591 days.

(21) Appl. No.: 13/337,962

(22) Filed: Dec. 27, 2011

(65) Prior Publication Data
US 2013/0164560 A1    Jun. 27, 2013

(51) Int. Cl.
| | | |
|---|---|---|
| *B05D 5/06* | (2006.01) | |
| *C03C 17/34* | (2006.01) | |
| *C03C 17/36* | (2006.01) | |

(52) U.S. Cl.
CPC ............. *C03C 17/34* (2013.01); *C03C 17/366* (2013.01)

(58) Field of Classification Search
CPC ............ C03C 17/3435; C03C 17/3607; C03C 17/366; C03C 17/225; C03C 17/2453; C03C 17/34; C03C 17/36
USPC .......................................... 427/162, 164, 165
See application file for complete search history.

(56) References Cited

U.S. PATENT DOCUMENTS

| | | | |
|---|---|---|---|
| 6,495,251 B1 | 12/2002 | Arbab | |
| 6,783,876 B2 * | 8/2004 | Schicht et al. | ................ 428/697 |
| 7,267,879 B2 | 9/2007 | Thomsen | |
| 7,413,768 B2 | 8/2008 | O'Shaughnessy | |
| 7,745,009 B2 | 6/2010 | Decroupet | |
| 2002/0031674 A1 | 3/2002 | Laird | |
| 2004/0219343 A1 * | 11/2004 | DePauw | ........................ 428/212 |
| 2005/0069717 A1 * | 3/2005 | Stachowiak | ................... 428/432 |
| 2007/0281171 A1 * | 12/2007 | Coster et al. | ................... 428/432 |
| 2008/0014448 A1 * | 1/2008 | Lu et al. | ........................ 428/432 |
| 2009/0324967 A1 | 12/2009 | Disteldorf | |
| 2010/0167034 A1 | 7/2010 | Depauw et al. | |

* cited by examiner

*Primary Examiner* — Elizabeth Burkhart

(57) ABSTRACT

Embodiments provided herein describe a low-e panel and a method for forming a low-e panel. A transparent substrate is provided. A metal oxynitride layer is formed over the transparent substrate. The metal oxynitride layer includes a first metal and a second metal. A reflective layer is formed over the transparent substrate.

18 Claims, 2 Drawing Sheets

US 9,011,969 B2

LOW-E PANEL WITH IMPROVED DIELECTRIC LAYER AND METHOD FOR FORMING THE SAME

The present invention relates to low-e panels. More particularly, this invention relates to low-e panels having an improved dielectric layer and a method for forming such low-e panels.

BACKGROUND OF THE INVENTION

Low emissivity, or low-e, panels are often formed by depositing a reflective layer (e.g., silver), along with various other layers, onto a transparent (e.g., glass) substrate. The various layers typically include dielectric layers, such as silicon nitride, tin oxide, and zinc oxide, to provide a barrier between the stack and both the substrate and the environment, as well as to act as optical fillers and function as anti-reflective coating layers to improve the optical characteristics of the panel.

Conventional low-e panels using such dielectric layers often form cracks along grain boundaries, especially in applications where the substrate is bent or otherwise shaped. Additionally, conventional low-e panels often demonstrate significant changes in color during heat treatment (or tempering) after the layers (i.e., the stack) are formed on the substrate. As such, the tempered panels appear to have a different color than those that have not been tempered.

One current solution involves the use of silicon nitride layers, with one being immediately adjacent to the substrate and another being on top of the stack (i.e., exposed to the environment). While the silicon nitride layers are relatively stable and provide suitable protection from, for example, sodium diffusion from the substrate and moisture in the environment, the deposition rate of such silicon nitride layers is relatively slow and generally requires the use of other dielectric layers as well, such an tin oxide and/or zinc oxide. As a result, manufacturing costs are increased due to the fact that additional targets are required to deposit additional layers.

BRIEF DESCRIPTION OF THE DRAWINGS

Various embodiments of the invention are disclosed in the following detailed description and the accompanying drawings.

DETAILED DESCRIPTION

Figure 1:
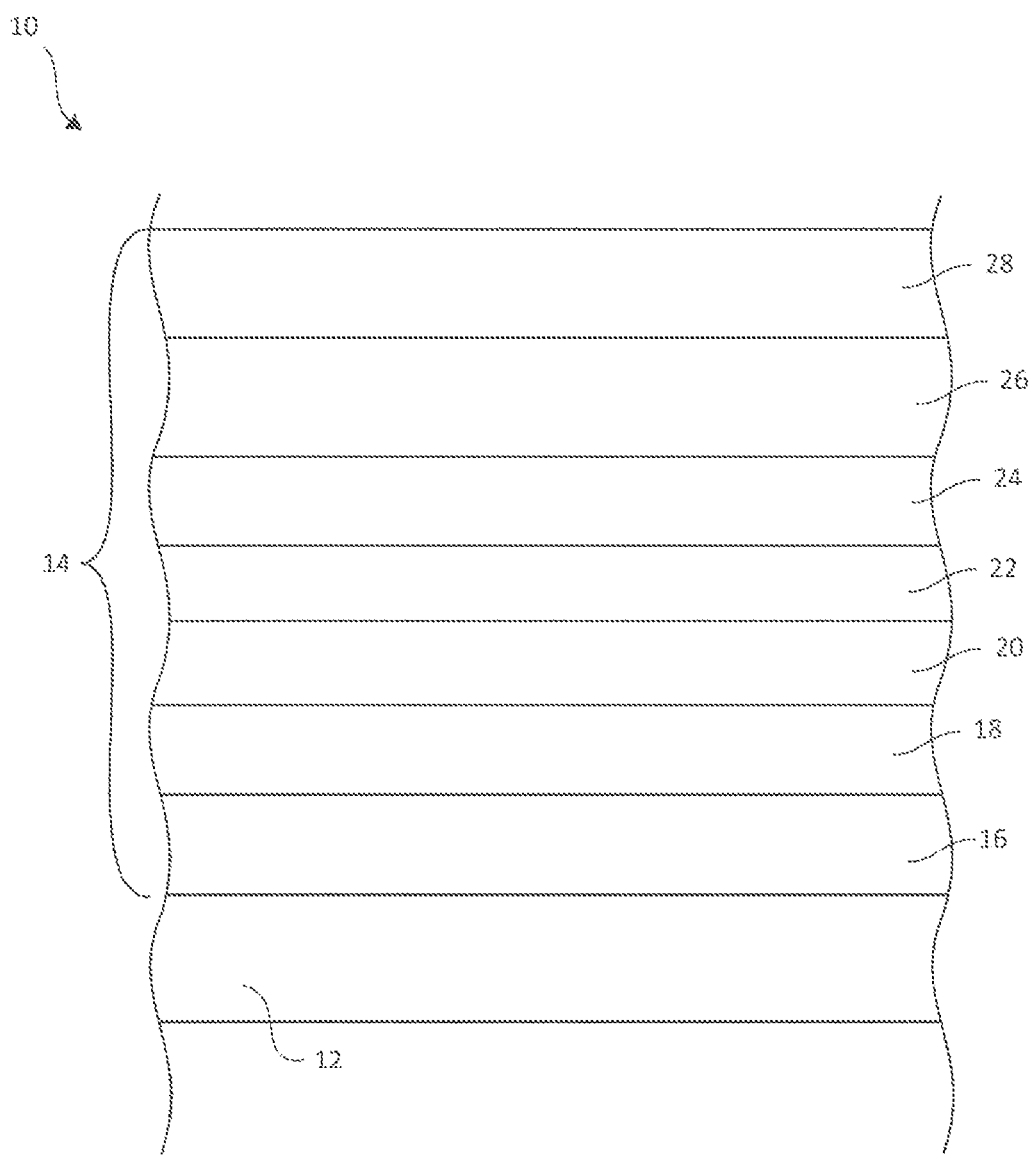
FIG. 1 is a cross-sectional side view of a low-e panel according to one embodiment of the present invention.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Embodiments described herein provide low-e panels with improved structural reliability and improved stability with respect to optical properties. According to one aspect, a metal oxynitride dielectric is used in the low-e stack. In one embodiment, the metal oxynitride is a binary metal oxynitride (i.e., includes two metals). However, in other embodiments, additional metals (i.e., more than two metals) may be used. The metal oxynitride is, for example, based on tin oxide or zinc oxide, and includes at least one additional metal (i.e., additional metals, in addition to the tin or zinc), along with nitrogen. Examples of the second metal include magnesium, aluminum, lanthanum, yttrium, titanium, antimony, strontium, bismuth, and silicon.

The resulting dielectric layer forms an amorphous phase, which is stable after subsequent processes, such as heat treatments. The amorphous phase reduces grain boundaries that are susceptible to cracking in conventional low-e panels. As a result, low-e panels described herein may be bent and shaped without any cracking occurring along grain boundaries.

Additionally, the stability of the optical properties of the panels described herein are improved when compared to conventional panels. Specifically, changes in optical properties, such as refractive index (n) and extinction coefficient (k), caused by heat treatment are reduced, as are changes in overall color.

Further, the addition of nitrogen into the dielectric layer, results in a material with a lower energy state. As a result, the low-e stack described herein provides a stable barrier against sodium diffusion, as well as moisture and air in the environment.

In one embodiment, a method for forming a low-e panel is provided. A transparent substrate is provided. A metal oxynitride layer is formed over the transparent substrate. The metal oxynitride layer comprises a first metal and a second metal. A reflective layer is formed over the transparent substrate. The first metal may include tin or zinc. The second metal may include magnesium, aluminum, lanthanum, yttrium, titanium, antimony, strontium, or bismuth. In one particular embodiment, the second metal is magnesium, lanthanum, yttrium, strontium, bismuth, or silicon.

FIG. 1 illustrates a low-e panel 10 according to one embodiment of the present invention. The low-e panel 10 includes a transparent substrate 12 and a low-e stack 14 formed over the substrate 12. The transparent substrate 12 in one embodiment is made of a low emissivity glass, such as borosilicate glass. However, in other embodiments, the transparent substrate 12 may be made of plastic or polycarbonate. The substrate 12 has a thickness of, for example, between about 1 and about 10 millimeters (mm). In a testing environment, the substrate 12 may be round with a diameter of, for example, about 200 or about 300 mm. However, in a manufacturing environment, the substrate 12 may be square or rectangular and significantly larger (e.g., about 0.5-about 6 meters (m) across).

The low-e stack 14 includes a lower dielectric layer 16, a lower metal oxide layer 18, a reflective layer 20, a metal alloy layer 22, an upper metal oxide layer 24, an upper dielectric layer 26, and a protective layer 28. Exemplary details as to the functionality provided by each of the layers 16-28 are provided below.

The various layers in the low-e stack 14 may be formed sequentially (i.e., from bottom to top) on the transparent substrate 12 using a physical vapor deposition (PVD) and/or reactive sputtering processing tool. In one embodiment, the low-e stack 14 is formed over the entire substrate 12. However, in other embodiments, the low-e stack 14 may only be formed on isolated portions of the substrate 12.

Still referring to FIG. 1, the lower dielectric layer 16 is formed above (or over) the upper surface of the substrate 12. In one embodiment, the lower dielectric layer 16 is made of a binary metal oxynitride. That is, the lower dielectric layer 16 may be made of a metal oxynitride that includes two metals. The first of the two metals may be tin or zinc. In one embodiment, first metal accounts for between about 15% and about 92% by weight of the material of the lower dielectric layer 16. The second metal may be magnesium, aluminum, lanthanum, yttrium, titanium, antimony, strontium, bismuth, or silicon. In one embodiment, the second metal accounts for between about 3% and about 55% by weight of the material of the lower dielectric layer 16. As described above, the resulting lower dielectric layer 16 has, when compared to prior art dielectrics, a reduced number of grain boundaries and demonstrates improved optical stability.

The lower dielectric layer 16 has a thickness of, for example, about 250 Angstroms (Å). The lower dielectric layer 16 may protect the other layers in the stack 14 from any elements which may otherwise diffuse from the substrate 12 and may be used to tune the optical properties (e.g., transmission) of the stack 14 and/or the low-e panel 10 as a whole. For example, the thickness and refractive index of the lower dielectric layer 16 may be used to increase or decrease visible light transmission.

The lower metal oxide layer 18 is formed over the substrate 12 and above the lower dielectric layer 16. In one embodiment, the lower metal oxide layer 18 is made of zinc oxide and has a thickness of, for example, about 100 Å. The lower metal oxide layer 18 may enhance the texturing of the reflective layer 20 and increase the transmission of the stack 14 for anti-reflection purposes. It should be understood that in other embodiments, the lower metal oxide layer 18 may be made of tin oxide or may not be included at all.

Referring again to FIG. 1, in the depicted embodiment, the reflective layer 20 is formed above the lower metal oxide layer 18. In one embodiment, the reflective layer 20 is made of silver and has a thickness of, for example, about 100 Å.

Still referring to FIG. 1, the metal alloy layer 22 and the upper metal oxide layer 24 are formed above the reflective layer 20. In one embodiment, the metal alloy layer 22 is made of nickel-chromium and has a thickness of, for example, about 30 Å. In another embodiment, the metal alloy layer 22 is made of nickel-titanium. The metal alloy layer 22 may prevent the reflective layer 20 from oxidizing and protect the reflective layer 20 during subsequent processing steps, such as heating. The upper metal oxide layer 24 is formed above the metal alloy layer 22.

In one embodiment, the upper metal oxide layer 24 includes the metal alloy of the metal alloy layer 22 (e.g., nickel-chromium oxide or nickel-titanium oxide) and has a thickness of, for example, about 30 Å. The upper metal (or metal alloy) oxide layer 24 may provide adhesion between the reflective layer 20 and the upper dielectric layer 26.

The upper dielectric layer 26 is formed above the upper metal oxide layer 24. In one embodiment, the upper dielectric layer 26 is made of the same material as the lower dielectric layer 16 (e.g., a binary metal oxynitride) and has the same thickness as the lower dielectric layer 16. The upper dielectric layer 26 may be used for anti-reflection purposes, as well as a barrier against the environment.

Still referring to FIG. 1, the protective layer 28 is formed above the upper dielectric layer 26. In one embodiment, the protective layer 28 is made of silicon nitride and has a thickness of, for example, about 250 Å. The protective layer 28 may be used to provide additional protection for the lower layers of the stack 14 and further adjust the optical properties of the stack 14. However, it should be understood that some embodiments may not include the protective layer 28. Additionally, although not shown in FIG. 1, some embodiments may also include a second protective layer (e.g., silicon nitride) between the substrate 12 and the lower dielectric layer 16.

It should be noted that depending on the exact materials used, some of the layers of the low-e stack 14 may have some materials in common. An example of such a stack may use a zinc-based material in the dielectric layers 16 and 26 and include the zinc oxide lower metal oxide layer 18. As a result, embodiments described herein may allow for a relatively low number of different targets to be used for the formation of the low-e stack 14. This is particularly true for embodiments that do not include the protective layer 28.

Thus, in one embodiment, a method for forming a low-e panel is provided. A transparent substrate is provided. A metal oxynitride layer is formed over the transparent substrate. The metal oxynitride layer includes a first metal and a second metal. The second metal includes one of magnesium, lanthanum, yttrium, strontium, bismuth, or silicon. A reflective layer is formed over the transparent substrate.

In another embodiment, a low-e panel is provided. The low-e panel includes a transparent substrate, a metal oxynitride layer formed over the transparent substrate, and a reflective layer formed over the metal oxynitride layer. The metal oxynitride layer includes a first metal and a second metal. The second metal includes one of magnesium, lanthanum, yttrium, strontium, bismuth, or silicon.

In a further embodiment, a method for forming a low-e panel is provided. A transparent substrate is provided. A reflective layer is formed over the transparent substrate. First and second metal oxynitride layers are formed over the transparent substrate. The reflective layer is formed over the first metal oxynitride layer, and the second metal oxynitride layer is formed over the reflective layer. Each of the first and second metal oxynitride layers includes a first metal and a second metal. The second metal includes one of magnesium, lanthanum, yttrium, strontium, bismuth, or silicon.

Figure 2:
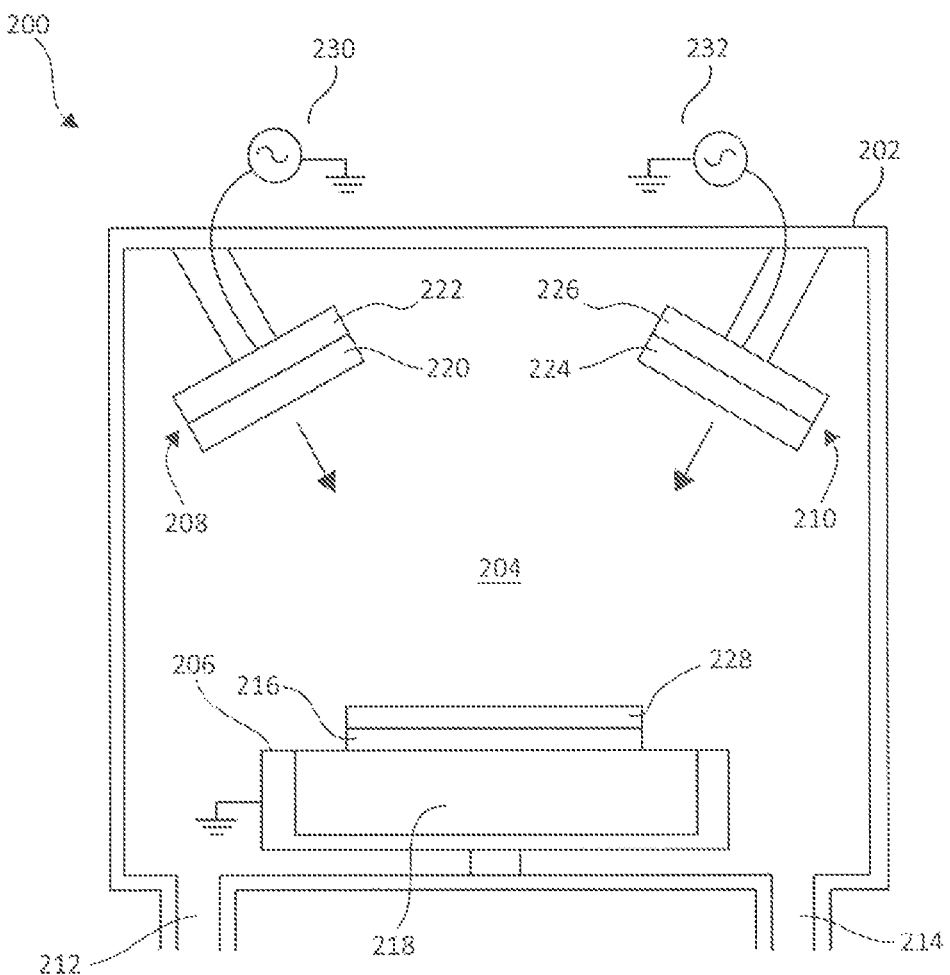
FIG. 2 is a simplified cross-sectional diagram illustrating a physical vapor deposition (PVD) tool according to one embodiment of the present invention.

FIG. 2 provides a simplified illustration of a physical vapor deposition (PVD) tool (and/or system) 200 which may be used to formed the low-e panel 10 and/or the low-e stack 14 described above, in accordance with one embodiment of the invention. The PVD tool 200 shown in FIG. 2 includes a housing 202 that defines, or encloses, a processing chamber 204, a substrate support 206, a first target assembly 208, and a second target assembly 210.

The housing 202 includes a gas inlet 212 and a gas outlet 214 near a lower region thereof on opposing sides of the substrate support 206. The substrate support 206 is positioned near the lower region of the housing 202 and in configured to support a substrate 216. The substrate 216 may be a round glass (e.g., borosilicate glass) substrate having a diameter of, for example, about 200 mm or about 300 mm. In other embodiments (such as in a manufacturing environment), the substrate 216 may have other shapes, such as square or rectangular, and may be significantly larger (e.g., about 0.5-about 6 m across). The substrate support 206 includes a support electrode 218 and is held at ground potential during processing, as indicated.

The first and second target assemblies (or process heads) 208 and 210 are suspended from an upper region of the housing 202 within the processing chamber 204. The first target assembly 208 includes a first target 220 and a first target electrode 222, and the second target assembly 210 includes a second target 224 and a second target electrode 226. As shown, the first target 220 and the second target 224 are oriented or directed towards the substrate 216. As is commonly understood, the first target 220 and the second target 224 include one or more materials that are to be used to deposit a layer of material 228 on the upper surface of the substrate 216.

The materials used in the targets 220 and 224 may, for example, include tin, zinc, magnesium, aluminum, lanthanum, yttrium, titanium, antimony, strontium, bismuth, silicon, silver, nickel, chromium, or any combination thereof (i.e., a single target may be made of an alloy of several metals). Additionally, the materials used in the targets may include oxygen, nitrogen, or a combination of oxygen and nitrogen in order to form the oxides, nitrides, and oxynitrides described above. Additionally, although only two targets 220 and 224 are shown in the depicted embodiment, additional targets may be used. As such, different combinations of targets may be used to form, for example, the dielectric layers described above. For example, in an embodiment in which the dielectric material is zinc-tin-titanium oxide, the zinc, the tin, and the titanium may be provided by separate zinc, tin, and titanium targets, or they may be provided by a single zinc-tin-titanium alloy target.

The PVD tool 200 also includes a first power supply 230 coupled to the first target electrode 222 and a second power supply 232 coupled to the second target electrode 224. As is commonly understood, the power supplies 230 and 232 pulse direct current (DC) power to the respective electrodes, causing material to be, at least in some embodiments, simultaneously sputtered (i.e., co-sputtered) from the first and second targets 220 and 224.

During sputtering, inert gases, such as argon or kypton, may be introduced into the processing chamber 204 through the gas inlet 212, while a vacuum is applied to the gas outlet 214. However, in embodiments in which reactive sputtering is used, reactive gases may also be introduced, such as oxygen and/or nitrogen, which interact with particles ejected from the targets (i.e., to form oxides, nitrides, and/or oxynitrides).

Although not shown in FIG. 2, the PVD tool 200 may also include a control system having, for example, a processor and a memory, which is in operable communication with the other components shown in FIG. 2 and configured to control the operation thereof in order to perform the methods described herein.

Further, although the PVD tool 200 shown in FIG. 2 includes a stationary substrate support 206, it should be understood that in a manufacturing environment, the substrate 216 may be in motion during the various layers described herein.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method for forming a low-e panel comprising:
   providing a transparent substrate;
   forming a metal oxynitride layer over the transparent substrate, wherein the metal oxynitride layer comprises a first metal and a second metal, wherein the second metal comprises strontium; and
   forming a reflective layer over the transparent substrate.

2. The method of claim 1, wherein the first metal comprises tin or zinc.

3. The method of claim 2, wherein the first metal comprises tin.

4. The method of claim 3, wherein the reflective layer is formed over the metal oxynitride layer, and further comprising forming a second metal oxynitride layer over the reflective layer, wherein the second metal oxynitride layer comprises one of tin or zinc and further comprises one of magnesium or strontium.

5. The method of claim 4, further comprising forming at least one layer comprising nickel over the transparent substrate, wherein the second metal oxynitride layer is formed over the at least one layer comprising nickel.

6. The method of claim 5, wherein the at least one layer comprising nickel comprises nickel-chromium or nickel-titanium.

7. The method of claim 3, wherein the reflective layer comprises silver and is formed directly on the metal oxynitride layer.

8. A method for forming a low-e panel comprising:
   providing a transparent substrate;
   forming a reflective layer over the transparent substrate; and
   forming first and second metal oxynitride layers over the transparent substrate, wherein the reflective layer is formed over the first metal oxynitride layer and the second metal oxynitride layer is formed over the reflective layer, and wherein each of the first and second metal oxynitride layers comprises tin magnesium oxynitride or tin strontium oxynitride.

9. The method of claim 8, wherein each of the first and second metal oxynitride layers comprises tin strontium oxynitride.

10. The method of claim 9, wherein the reflective layer comprises silver and is formed directly on the first metal oxynitride layer.

11. The method of claim 10, further comprising forming at least one layer comprising nickel between the reflective layer and the second metal oxynitride layer.

12. The method of claim 11, wherein the at least one layer comprising nickel comprises a metal alloy layer and a metal alloy oxide layer, and wherein the metal alloy layer comprises nickel-chromium or nickel-titanium and the metal alloy oxide layer comprises nickel-chromium oxide or nickel-titanium oxide.

13. The method of claim 12, wherein the transparent substrate comprises glass.

14. A method for forming a low-e panel comprising:
   providing a transparent substrate;
   forming a first metal oxynitride layer above the transparent substrate, wherein the first metal oxynitride layer comprises a first metal and a second metal, wherein the first metal comprises zinc or tin and the second metal comprises strontium;
   forming a reflective layer above the first metal oxynitride layer;
   forming a metal alloy layer above the reflective layer, wherein the metal alloy layer comprises nickel-chromium or nickel-titanium;
   forming a metal alloy oxide layer above the metal alloy layer, wherein the metal alloy oxide layer comprises nickel-chromium oxide or nickel-titanium oxide; and
   forming a second metal oxynitride layer above the metal alloy oxide layer, wherein the second metal oxynitride layer comprises a third metal and a fourth metal, wherein the third metal comprises zinc or tin and the fourth metal comprises strontium.

15. The method of claim 14, wherein the reflective layer comprises silver, the first metal comprises tin, and the third metal comprises tin.

16. The method of claim 15, wherein the first metal oxynitride layer has a thickness of about 250 Angstroms (Å).

17. The method of claim 16, wherein the reflective layer has a thickness of about 100 Å.

18. The method of claim 17, wherein the second metal oxynitride layer has a thickness of about 250 Å.

* * * * *